United States Patent [19]
Sasaki et al.

[11] Patent Number: 5,363,210
[45] Date of Patent: Nov. 8, 1994

[54] APPARATUS OUTPUTTING QUANTIZED IMAGE DATA, SELECTING FROM FILTERS WITH DIFFERENT ERROR SPREADING EFFECTS

[75] Inventors: Tomio Sasaki; Masahito Obata, both of Tokyo, Japan

[73] Assignee: Ricoh Company, Ltd., Tokyo, Japan

[21] Appl. No.: 950,173

[22] Filed: Sep. 24, 1992

[30] Foreign Application Priority Data

Sep. 30, 1991 [JP] Japan .................. 3-251622

[51] Int. Cl.$^5$ ............................................. G06F 15/70
[52] U.S. Cl. ................................. 358/448; 358/446; 358/459; 358/462; 358/443; 382/54; 382/22
[58] Field of Search ............. 358/448, 457, 456, 135, 358/136, 105, 133, 443, 463, 75, 80, 459, 465, 464, 462, 467, 141, 13, 12; 382/47, 22, 54, 41, 50, 52, 27

[56] References Cited

U.S. PATENT DOCUMENTS

| | | | |
|---|---|---|---|
| 4,975,786 | 12/1990 | Katayama et al. | 358/457 |
| 4,982,285 | 1/1991 | Sugiyama | 358/136 |
| 5,054,100 | 10/1991 | Tai | 382/47 |
| 5,068,746 | 11/1991 | Ohsawa et al. | 358/443 |
| 5,086,484 | 2/1992 | Katayama et al. | 358/465 |
| 5,121,447 | 6/1992 | Tanioka et al. | 358/466 |
| 5,157,741 | 10/1992 | Katayama | 358/459 |
| 5,179,442 | 1/1993 | Azadegan et al. | 358/133 |
| 5,208,871 | 5/1993 | Eschbach | 358/456 |
| 5,226,094 | 7/1993 | Eschbach | 358/456 |

FOREIGN PATENT DOCUMENTS 1-303869 12/1989 Japan .

*Primary Examiner*—Paul Ip
*Attorney, Agent, or Firm*—Mason, Fenwick, Lawrence, Popham, Haik, Schnobrich & Kaufman, Ltd.

[57] ABSTRACT

An image processing apparatus includes an edge detector for detecting whether or not a target pixel of an input image signal is at an edge portion of a discontinuous density image; a first quantizer for generating quantized image data with respect to the target pixel by using a first error spreading filter having a relatively high error spreading effect, such that a density error between the input image signal and an output multilevel image signal is incorporated in "m" neighboring pixels surrounding the target pixel; a second quantizer for generating quantized image data with respect to the target pixel by using a second error spreading filter having a relatively low error spreading effect, such that a density error between the input image signal and the output multilevel image signal is incorporated in "m" neighboring pixels surrounding the target pixel; and a selector for selecting either the quantized image data generated by the first quantizer or the quantized image data generated by the second quantizer in accordance with the result of a detection made by the edge detector.

8 Claims, 8 Drawing Sheets

FIG.4

| | |
|---|---|
| a | A − axy, B − axy, − − −, G − axy, H − axy |
| b | A − E, C − G, B − F, D − H |
| c | (B+A+H) − (D+E+F), (B+C+D) − (F+G+H) |
| d | A+E−2axy, B+F−2axy, C+G−2axy<br>D+H−2axy |
| e | (A+C+E+G) − 4axy |
| f | (A+B+C+D+E+F+G+H) − 8axy |
| g | (B+2A+H) − (D+2E+F), (D+2C+B) − (F+2G+H) |
| h | (A+B+C+D+E) − (F+G+H+2axy) |

| D | C | B |
|---|---|---|
| E | axy | A |
| F | G | H |

FIG.5A

| 1 | 3 | 5 | 3 | 1 |
|---|---|---|---|---|
| 3 | 5 | 7 | 5 | 3 |
| 5 | 7 | P |   |   |

$\times \frac{1}{48}$ $a_{ij}$

FIG.5B

| 1 | 1 | 1 | 1 | 1 |
|---|---|---|---|---|
| 1 | 1 | 1 | 1 | 1 |
| 1 | 1 | P |   |   |

$\times \frac{1}{12}$ $b_{ij}$

FIG.6A

| $f_{mo}$ | $O_i$ | $e_{mn}$ |
|---|---|---|
| 0 ~ 127 | 0 | 0 ~ 127 |
| 128 ~ 255 | 255 | 127 ~ 0 |

FIG.6B

| $f_{mno}$ | $O_i$ | $e_{mn}$ |
|---|---|---|
| 0 ~ 63 | 0 | 0 ~ 63 |
| 64 ~ 127 | 85 | -21 ~ 42 |
| 128 ~ 191 | 170 | -42 ~ 21 |
| 192 ~ 255 | 255 | -63 ~ 0 |

FIG. 7A

| 1 | 1 | 2 | 1 | 1 |
|---|---|---|---|---|
| 1 | 2 | 3 | 2 | 1 |
| 2 | 3 | P |   |   |

$\times \frac{1}{20}$ $a_{ij}$

FIG. 7B

| 2 | 3 | 2 |
|---|---|---|
| 3 | P |   |

$\times \frac{1}{10}$ $b_{ij}$

FIG.10

| -12 | -4 | 0 | 0 | -4 | -12 |
|---|---|---|---|---|---|
| -4 | 0 | 4 | 4 | 0 | -4 |
| 0 | 4 | 12 | 12 | 4 | 0 |
| 0 | 4 | 12 | 12 | 4 | 0 |
| -4 | 0 | 4 | 4 | 0 | -4 |
| -12 | -4 | 0 | 0 | -4 | -12 |

APPARATUS OUTPUTTING QUANTIZED IMAGE DATA, SELECTING FROM FILTERS WITH DIFFERENT ERROR SPREADING EFFECTS

BACKGROUND OF THE INVENTION

The present invention generally relates to an image processing apparatus, and more particularly to an image processing apparatus in which an image is quantized through an error spreading process to output a bi-level or multilevel image to a printer. This apparatus is applicable to digital PPCs, scanners, and facsimila machines.

Conventionally, there is an image processing apparatus in which an input image is quantized through an error spreading filter. For example, Japanese Laid-Open Patent Publication No. 1-303869 discloses an image processing apparatus of this type. In this image processing apparatus, when an image is quantized through an error spreading filter, quantizing errors between the input data and the output data are always stored, and corresponding dots are output. If the input image has a certain level of density for a white background portion thereof, undesired dots or irregular edges appear in the output image for the white background portion.

In the conventional apparatus described above, a white background portion of the input image is discriminated by calculating an average of densities with respect to a target pixel and neighboring pixels surrounding the target pixel in the input image and by comparing the average of the densities with a suitably adjusted reference value. When it is detected that the target pixel is at the white background portion, the conventional apparatus described above does not output a dot with respect to that pixel so as to prevent the undesired dot to irregular edge from appearing in the output image.

However, in the above described apparatus, after the input image is quantized through the error spreading filter, undesired stripes or textures may appear in the output image for a highlight portion (or a white level portion) of a continuous halftone image such as a photograph, or irregular edges or noises may appear in the output image for an edge portion of a discontinuous density image such as a character. Hence, the picture quality is degraded when such an image is processed.

Moreover, several methods for image quantization through error spreading filters have been proposed in order to achieve image quantization with good picture quality of the output image. For example, a fixed threshold method utilizing "n−1" fixed threshold values to produce image data indicating one of "n" different density levels is one of the proposed methods. If the fixed threshold method mentioned above is used, the resolution of the output image for a discontinuous density image such as a character is satisfactory. However, an undesired pseudo outline may appear in the output image for a continuous halftone image such as a photograph, and an undesired moire may appear in the output image for a screened halftone image such as a dot photograph. Another one of the proposed methods is the multilevel dither method, and this method is useful because satisfactory gradation characteristics of the output image for a continuous halftone image can be produced. However, if the multilevel dither method mentioned above is used for a discontinuous density image being input, the resolution of the output image for the input discontinuous density image becomes poor, and a moire may appear at a halftone portion of a screened halftone image due to the interference between the image and the dither pattern being used.

As described above, in the cases of the conventional methods, it is difficult to make both the resolution and the gradation characteristics satisfactory after the input image has been quantized through the error spreading process, for an image selected from among a continuous halftone image, a screened halftone image, and a discontinuous density image.

SUMMARY OF THE INVENTION

Accordingly, it is a general object of the present invention to provide an improved image processing apparatus in which the above described problems are eliminated.

Another, more specific object of the present invention is to provide an image processing apparatus in which undesired textures at a highlight portion of a continuous halftone image such as a photograph, and irregular edges at an edge portion of a discontinuous density image such as a character, which undesired textures and irregular edges are due to the image quantization, are efficiently reduced from the output image. The above mentioned object of the present invention is achieved by an image processing apparatus in which an input image signal is quantized into an output multilevel image signal through an error spreading process, the output multilevel image signal indicating one of "n" different density levels, the image processing apparatus including: a detection part for detecting whether or not a target pixel of the input image signal is at an edge portion of a bi-level image; a first quantizer for generating quantized image data with respect to the target pixel by using a first error spreading filter containing a set of weight factors aij ($1 \leq i \leq m$; $1 \leq j \leq n$), the filter having a relatively high error spreading effect, such that a density error between the input image signal and the output multilevel image signal, which error is multiplied by one of the weight factors aij, is incorporated in "m" neighboring pixels surrounding the target pixel; a second quantizer for generating quantized image data with respect to the target pixel by using a second error spreading filter containing a set of weight factors bij ($1 \leq i \leq m$; $1 \leq j \leq n$), the filter having a relatively low error spreading effect, such that a density error between the input image signal and the output multilevel image signal, which error is multiplied by one of the weight factors bij, is incorporated in "m" neighboring pixels surrounding the target pixel; and a selection part for selecting either the quantized image data generated by the first quantizer or the quantized image data generated by the second quantizer in accordance with the result of a detection made by the detection part. In this image processing apparatus, the quantized image data generated by the second quantizer is selected to output the quantized image data when the detection part detects the target pixel as lying at an edge portion of a bi-level image, and, when the detection part detects that the target pixel does not lie at an edge portion of a bi-level image, the quantized image data generated by the first quantizer is selected to output the quantized image data. According to the present invention, it is possible to make both the resolution of the output image and the gradation characteristics thereof satisfactory when the input image is quantized using the error spreading filter for any kind of images among a discontinuous density image, a continuous halftone image and a screened halftone image.

Other objects and further features of the present invention will become apparent from the following detailed description when read in conjunction with the accompanying drawings.

BRIEF DESCRIPTION OF THE DRAWINGS

FIG. 4 is a diagram showing the specifications of an edge detection filter used by an edge detector of the multilevel rendition part shown in FIG. 1;

FIGS. 5A and 5B are diagrams showing two sets of weight factors used by the multilevel rendition part shown in FIG. 1;

FIGS. 6A and 6B are charts showing the relationship between the corrected image data values, the correction values, and the error data values;

FIGS. 7A and 7B are diagrams showing other examples of the two sets of weight factors used by the multilevel rendition part shown in FIG. 1;

FIG. 10 is a diagram showing a fixed pattern of supplementary data output by the add-in data generator shown in FIG. 8.

DESCRIPTION OF THE PREFERRED EMBODIMENTS

Figure 3:
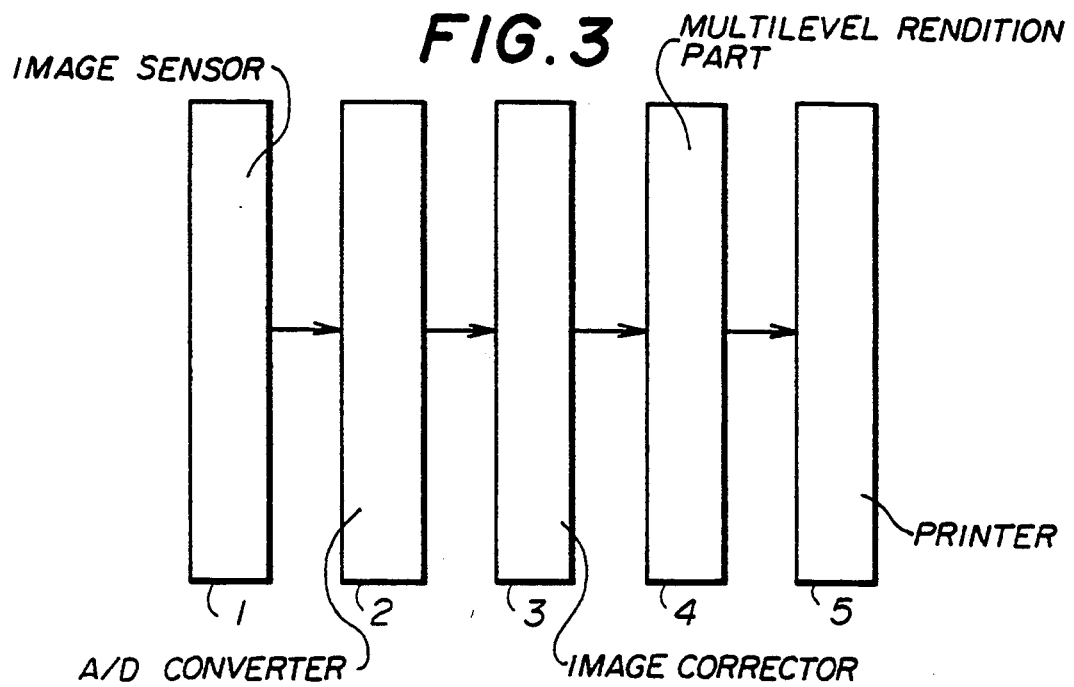
FIG. 3 is a block diagram showing the construction of the image processing apparatus to which the present invention is applied.

First, a description will now be given of an image processing apparatus to which the present invention is applied, with reference to FIG. 3. This image processing apparatus generally has an image sensor 1, an A/D converter 2, an image corrector 3, a multilevel rendition part 4, and a printer 5, as shown in FIG. 3. The image sensor 1 includes a CCD sensor part, and the image sensor 1 outputs an analog signal by making a raster scanning of an original image on a document. This analog signal output by the image sensor 1 is supplied to the A/D converter 2, and the A/D converter 2 generates a digital signal from the analog signal received from the image sensor 1. This digital signal is, for example, an 8-bit multilevel image signal to which the analog signal of the image sensor 1 is converted, and the 8-bit multilevel image signal indicates a density level or gradation level with respect to each picture element (pixel) in the original image, which level is one of among 256 ($=2^8$) different density levels.

The image signal is supplied by the A/D converter 2 to the image corrector 3. The image corrector 3 performs several image correction processes for correcting the image signal so as to eliminate undesired image sensor sensitivity variations, illuminance variations, and optical system light-quantity distortions which may be contained in the image signal received from the A/D converter 2. The image signal corrected by the image corrector 3 is supplied to the multilevel rendition part 4. The multilevel rendition part 4 quantizes a density level, indicated by the received image signal, through an error spreading process, so that a quantized image signal indicative of a bi-level or multilevel density is produced. The quantized image signal is supplied by the multilevel rendition part 4 to the printer 5 so that an image indicated by the quantized image signal is output.

Figure 1:
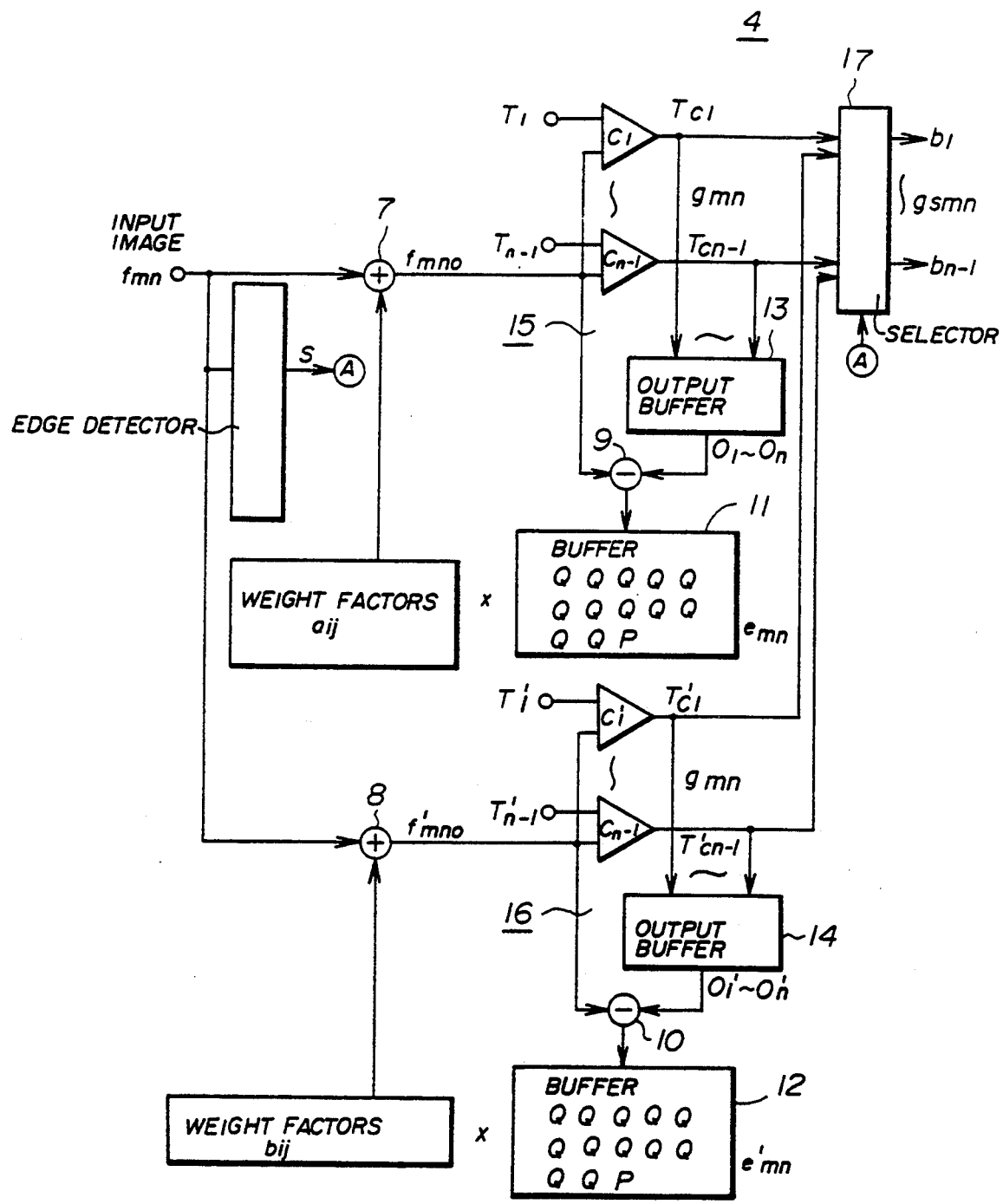
FIG. 1 is a diagram showing the construction of a first embodiment of a multilevel rendition part for use in an image processing apparatus according to the present invention.

Next, a description will be given of the construction of the multilevel rendition part, with reference to FIG. 1. FIG. 1 shows the construction of the multilevel rendition part 4 of the image processing apparatus shown in FIG. 3. This multilevel rendition part 4 generally has an edge detector 6, a first quantizer 15, a second quantizer 16, and a selector 17. Each of the first and second quantizers 15 and 16 performs an image quantization process of the input multilevel image signal.

The edge detector 6 in the multilevel rendition part 4 detects whether or not a target pixel in the input image signal "fmn" is at an edge portion of a discontinuous density image (or a bi-level image) such as a character. When the target pixel does not lie at an edge portion of a discontinuous density image, the edge detector 6 detects the target pixel as lying at a highlight portion of a continuous halftone image. The edge detector 6 outputs to the selector 17 a detect signal S indicating the result of the detection. In accordance with the detect signal S received from the edge detector 6, the selector 17 selects either the output data of the first quantizer 15 or the output data of the second quantizer 16. The selected output data is supplied by the selector 17 to the printer 5 so that an image indicated by the quantized image signal is output.

The first quantizer 15 includes a set of weight factors aij ($1 \leq i \leq m$, $1 \leq j \leq n$, where i, j, m, n are integers) having a relatively high error spreading effect. The first quantizer 15 also includes an adder 7, a subtracter 9, a buffer 11 for storing error data emn, an output buffer 13 for outputting correction values O1 through On−1 corresponding to the quantized image data gmn, and a set of comparators C1 through Cn−1 having respective threshold values T1 through Tn−1, which values are predetermined. At the first quantizer 15, the error data emn produced when the target pixel P is subjected to the multilevel rendition process ("n" levels, $n \geq 2$) are respectively multiplied by the weight factors aij, and they are "spread" to "m" neighboring pixels Q surrounding each of the target pixels P.

The second quantizer 16 includes a set of weight factors bij ($1 \leq i \leq m$, $1 \leq j \leq n$) having a relatively low error spreading effect. The second quantizer 15 also includes an adder 8, a subtracter 10, a buffer 12 for storing error data emn', an output buffer 14 for outputting correction values O1' through On−1' corresponding to the quantized image data gmn', and a set of comparators C1' through Cn−1' having respective threshold values T1' through Tn−1' which values are predetermined. At the second quantizer 16, the error data emn' produced when the target pixel P is subjected to the multilevel rendition process are respectively multiplied by the weight factors bij, and thus the error data are "spread" to "m" neighboring pixels Q surrounding each of the target pixels P.

In the above described embodiment, the weight factors aij of the first quantizer 15 have an error spreading effect different from that of the weight factors bij of the second quantizer 16. Generally, a weight factor corresponding to a neighboring pixel has a greater value the nearer that the pixel is located to the target pixel. In this embodiment, the rate of changes in the weight factors aij is greater than the rate of changes in the weight factors bij.

Next, a description will be given of the concept of the image quantization process performed by the multilevel rendition part 4 of the image processing apparatus. At each of the adders 7 and 8, the input multilevel image data fmn is converted into the corrected image data fmno or fmno'. At the comparators C1 through Cn−1, the quantized image data gmn (Tc1 through Tcn−1) is generated from the corrected image data fmno through the comparison with each of the threshold values T1 through Tn−1. At the comparators C1' through Cn−1', the quantized image data gmn' (Tc1' through Tcn−1') is generated from the corrected image data fmno' through the comparison with each of the threshold values T1' through Tn−1'. The correction values O1 through On corresponding to the quantized image data gmn are output from the output buffer 13 to the subtracter 9. The correction values O1' through On' corresponding to the quantized image data gmn' are output from the output buffer 14 to the subtracter 10.

Error data emn indicating the respective differences between the corrected image data fmno and the correction values O1 through On are stored in the buffer 11. Error data emn' indicating the respective differences between the corrected image data fmno' and the correction values O1' through On' are stored in the buffer 12. Each of the error data e(m−1, n−1), stored in the buffer 11 (or 12) when the image quantization process is performed with respect to the pixel of the input image preceding the target pixel, is multiplied by each of the weight factors aij (or bij), and each of the resultant data is normalized by dividing it by the sum of the weight factors aij (or bij). The normalized image data described above is input to the adder 7 (or 8), while the input multilevel image data fmn is also input to the adder 7 (or 8). Accordingly, the corrected image data "fmno" output by the adder 7 (or 8) is represented by the following formula:

$$fmno = fmn + (1/\Sigma aij) \Sigma aij \, e(m-1, n-1) \quad (1)$$

Thus, the quantized image data gmn and the error data emn are generated as indicated in the following formula (2). Both values of the quantized image data gmn and the error data emn are determined by comparing each of the corrected image data fmno with each of the threshold values T1 through Tn−1 in the comparators C1 through Cn−1.

| If fmno ≦ T1, then | gmn = 0 − th density level |
| | emn = fmno − O1 |
| If fmno ≦ T2, then | gmn = 1st density level |
| | emn = fmno − O2 |
| ... | |
| If fmno ≦ Tn − 1, then | gmn = (n − 2) − th density level |
| | emn = fmno − On − 1 |
| If fmno > Tn − 1, then | gmn = (n − 1) − th density level |
| | emn = fmno − On |
| | (2) |

As described in the foregoing, the image quantization process is carried out by each of the first and second quantizers 15 and 16 in the multilevel rendition part 4. The error data emn, produced after the image quantization process is performed with respect to the target pixel, is incorporated into the neighboring pixels surrounding the target pixel.

Figure 2:
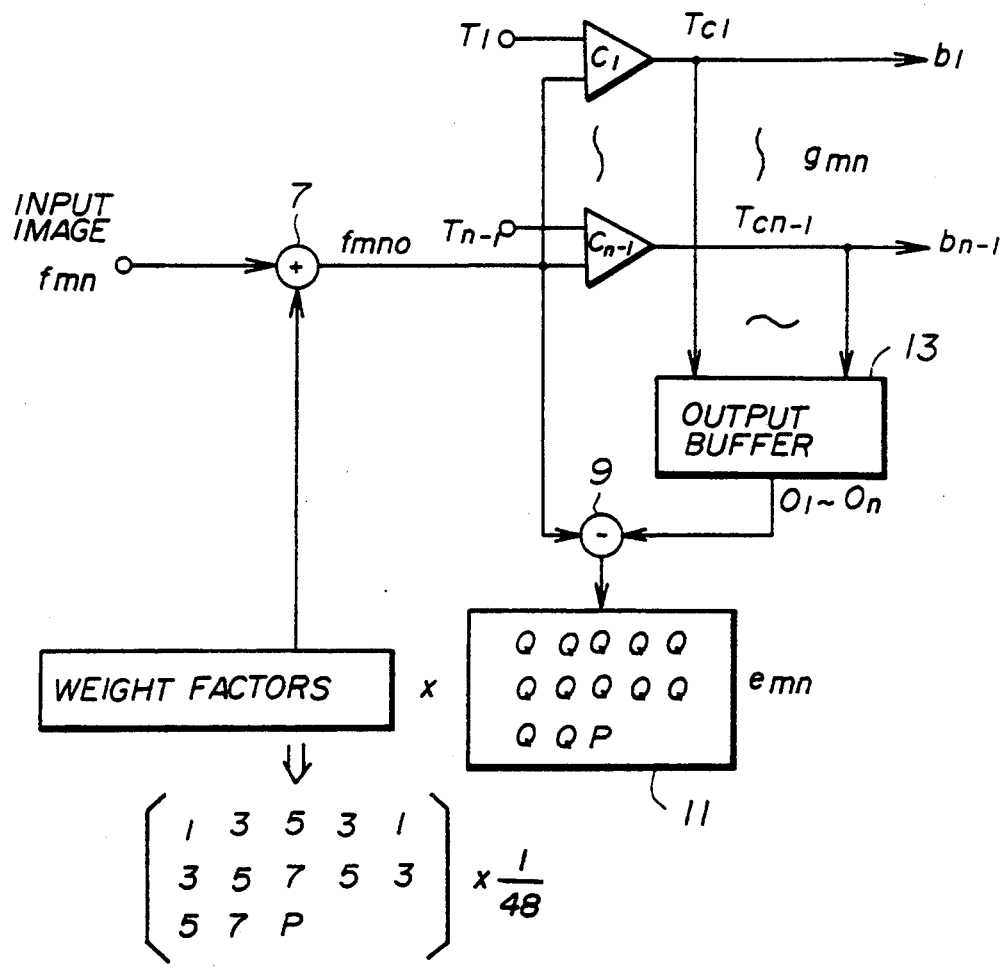
FIG. 2 is a diagram for explaining an image quantization process performed by the multilevel rendition part shown in FIG. 1.

A more detailed description will now be given, with reference to FIG. 2, of the image quantization process performed by the first quantizer 15. The image quantization process performed by the second quantizer 16 is essentially the same as that performed by the first quantizer 15, and a description thereof will be omitted. In FIG. 2, the input multilevel image signal fmn, supplied by the image corrector 3, is input to the adder 7. The input multilevel image data fmn is converted into the corrected image data fmno at the adder 7. The error data e(m−1, n−1) stored in the buffer 11 are respectively multiplied by the weight factors aij, and each of the resulting data is normalized by dividing it by the sum of the weight factors aij (or bij). The normalized image data is added to the input multilevel image data fmn at the adder 7, and thus the corrected image data fmno represented by the above formula (1) is output by the adder 7.

The corrected image data fmno is input to the comparators C1 through Cn−1, and the corrected image data fmno is compared with each of the threshold values T1 through Tn−1 of the comparators C1 through Cn−1, thus the comparators C1 through Cn−1 output the quantized image data gmn (Tc1 through Tcn−1). The quantized image data gmn is supplied to the printer 6 via the selector 17, and to the output buffer 13. The correction values O1 through On corresponding to the quantized image data gmn are output from the output buffer 13 to the subtracter 9. Also, the corrected image data fmno is input to the subtracter 9. Thus, the error data emn indicating the respective differences between the corrected image data fmno and the correction values O1 through On are stored in the buffer 11.

The quantized image data gmn and the error data emn are produced as per the above formula (2). The error data emn produced after the image quantization process is performed with respect to the target pixel is incorporated into the neighboring pixels surrounding the target pixel. Generally speaking, the error data emn stored in the buffer 11 or the buffer 12 is likely to have a positive value when the output image signal indicates a relatively low density; when the output image signal indicates a relatively high density the error data emn is likely to have a negative value, as shown in FIGS. 6A and 6B. By repeating the above described procedure, the multilevel rendition part 4 of the image processing apparatus shown in FIG. 1 quantizes the image through the error spreading process.

Next, a description will be given of the overall process performed by the multilevel rendition part 4 of the image processing apparatus shown in FIG. 1. The input image signal fmn, supplied by the image corrector 3, is input to the edge detector 6 and the adders 7 and 8. The edge detector 6 detects whether or not the target pixel being currently processed is at an edge portion of a discontinuous density image. When the target pixel does not lie at an edge portion of a discontinuous density image, the edge detector 6 detects the target pixel as lying at a highlight portion of a continuous halftone image. In order to achieve the edge detecting function described above, the edge detector 6 uses an edge detecting filter having the specifications shown in FIG. 4. As shown in FIG. 4, "axy" denotes the target pixel, and "A" through "H" denote the neighboring pixels surrounding the target pixel.

At the adder 7, the corrected image data fmno is generated by adding the error data $e(m-1, n-1)$ of the buffer 11, multiplied by the weight factors aij and normalized by the sum of the weight factors aij, to the input image data fmn. Similarly, at the adder 8, the corrected image data fmno' is generated by adding the error data $e(m-1, n-1)'$ of the buffer 12, multiplied by the weight factors bij and normalized by the sum of the weight factors bij, to the input image data fmn. The corrected image data fmno (or fmno') as represented by the above formula (1) are input to the subtracter 9 (or the subtracter 10) and each of the comparators C1 through $Cn-1$ (or each of the comparators C1' through $Cn-1'$).

Each of the corrected image data fmno (or fmno') is compared with each of the threshold values T1 through $Tn-1$ of the comparators C1 through $Cn-1$ (or each of the threshold values T1' through $Tn-1'$ of the comparators C1' through $Cn-1'$). Thus, at the comparators C1 through $Cn-1$ (or C1' through $Cn-1'$), the quantized image data gmn indicated by the output signals Tc1 through $Tcn-1$ of the comparators C1 through $Cn-1$, or the quantized image data gmn' indicated by the output signals Tc1' through $Tcn-1'$ of the comparators C1' through $Cn-1'$ is generated.

The quantized image data gmn (or gmn') is input to the selector 17 and the output buffer 13 (or 14). At the output buffer 13 (or 14), the correction values O1 through On corresponding to the quantized image data gmn, or the correction values O1' through On' corresponding to the quantized image data gmn' are generated. The correction values O1 through On and the corrected image data fmno are input to the subtracter 9, or the correction values O1' through On' and the corrected image data fmno' are input to the subtracter 10. Hence, the error data emn indicating the differences between the corrected image data fmno and the correction values O1 through On are stored in the buffer 11, or the error data emn' indicating the differences between the corrected image data fmno' and the correction values O1' through on' are stored in the buffer 12.

The quantized image data gmn (or gmn') and the error data emn (or emn') are produced as per the above formula (2). The error data emn (or emn') produced after the image quantization process is performed with respect to the target pixel is incorporated into the neighboring pixels Q surrounding the target pixel P.

At the selector 17, in accordance with the result of the detection made by the edge detector 6, either the output data quantized by the first quantizer 15 by using the weight factors aij, or the output data quantized by the second quantizer 16 by using the weight factors bij is selected. The selected output data is supplied from the selector 17 to the printer 5, so that an image indicated by the quantized image signal gsmn (b1 through $bn-1$) is output.

FIGS. 5A and 5B show examples of two sets of the weight factors aij and bij used by the multilevel rendition part 4 shown in FIG. 1. As described above, the weight factors aij of the first quantizer 15 shown in FIG. 5A have a relatively high error spreading effect, while the weight factors bij of the second quantizer 16 shown in FIG. 5B have a relatively low error spreading effect. More specifically, the rate of changes in the weight factors aij is greater than the rate of changes in the weight factors bij of the second quantizer 16. In the embodiment shown in FIGS. 5A and 5B, the values of the weight factors aij are preset in a manner such that a weight factor corresponding to a neighboring pixel has a greater value the nearer that that neighboring pixel is located to the target pixel, while the values of the weight factors bij corresponding to the neighboring pixels are preset as being equal to 1.

When the image quantization process is performed by using the weight factors aij shown in FIG. 5A, the error spreading effect of the target pixel on the neighboring pixels is greater if that neighboring pixel is located nearer the target pixel. It is possible to efficiently reduce undesired textures appearing at a portion corresponding to a highlight portion of a continuous halftone image such as a photograph, which undesired textures are due to the image quantization. However, in the present case, irregular edges may appear at an edge portion of a discontinuous density image after the input image is quantized. In contrast, when the image quantization process is performed by using the weight factors bij shown in FIG. 5B, the error spreading effect of the target pixel on the neighboring pixels is uniform. It is possible to efficiently reduce irregular edges at an edge portion of a bi-level or discontinuous density image such as a character, which irregular edges are due to the image quantization. However, in the instant case, undesired textures may appear at a portion of the output image corresponding to a highlight portion of a continuous halftone image.

In the above described embodiment, the edge detector 6 detects whether or not the target pixel being currently processed is at an edge portion of a discontinuous density image such as a character. When the target pixel is at an edge portion of a discontinuous density image, the selector 17 selects the quantized image data gmn' output by the second quantizer 16 using the weight factors bij. When the target pixel is not at an edge portion of a discontinuous density image, the edge detector 6 detects the target pixel as lying at a highlight portion of a continuous halftone image. The selector 17 selects the quantized image data gmn output by the first quantizer 15 using the weight factors aij. The selected output data is supplied from the selector 17 to the printer 5 so that an image indicated by the quantized image signal gsmn is output. Accordingly, in the image processing apparatus of the present invention, it is possible to efficiently reduce undesired textures at a highlight portion of a continuous halftone image as well as irregular edges at an edge portion of a discontinuous density image. Thus, when the image quantization process is performed through the error spreading filter, it is possible to make both the resolution of the output image and the gradation characteristics thereof satisfactory for any kind of input images.

FIGS. 7A and 7B show two sets of different weight factors used by the multilevel rendition part. An error spreading filter containing weight factors bij shown in FIG. 7B has a filter size smaller than that of an error spreading filter having weight factors aij shown in FIG. 7A.

As described above, when the weight factors shown in FIGS. 5A and 5B are used by the multilevel rendition part 4, the buffers 11 and 12 serve to "diffuse" the error data produced when the target pixel is quantized, to "m" neighboring pixels surrounding the target pixel. In contrast, when the weight factors aij and bij shown in FIGS. 7A and 7B are used by the multilevel rendition part 4, the buffer 11 serves to spread the error data emn produced when the target pixel is quantized using the weight factors aij, to "m" neighboring pixels surrounding the target pixel, while the buffer 12 serves to "diffuse" the error data emn' produced when the target pixel is quantized using the weight factors bij, to one neighboring pixel surrounding each of the target pixels.

In the case of the multilevel rendition part using the weight factors shown in FIGS. 7A and 7B, the selector 17 selects the quantized image data gmn, output by the first quantizer 15 using the weight factors aij having a larger filter size, when it is detected that the target pixel is at an edge portion of a discontinuous density image such as a character. In this case, it is possible to efficiently reduce irregular edges which may appear at an edge portion of a discontinuous density image. When it is detected that the target pixel is not at an edge portion of a discontinuous density image, the selector 17 selects the quantized image data gmn', output by the second quantizer 16 using the weight factors bij having a smaller filter size. In this case, it is possible to efficiently reduce undesired textures which may appear at a highlight portion of a continuous halftone image.

Figure 8:
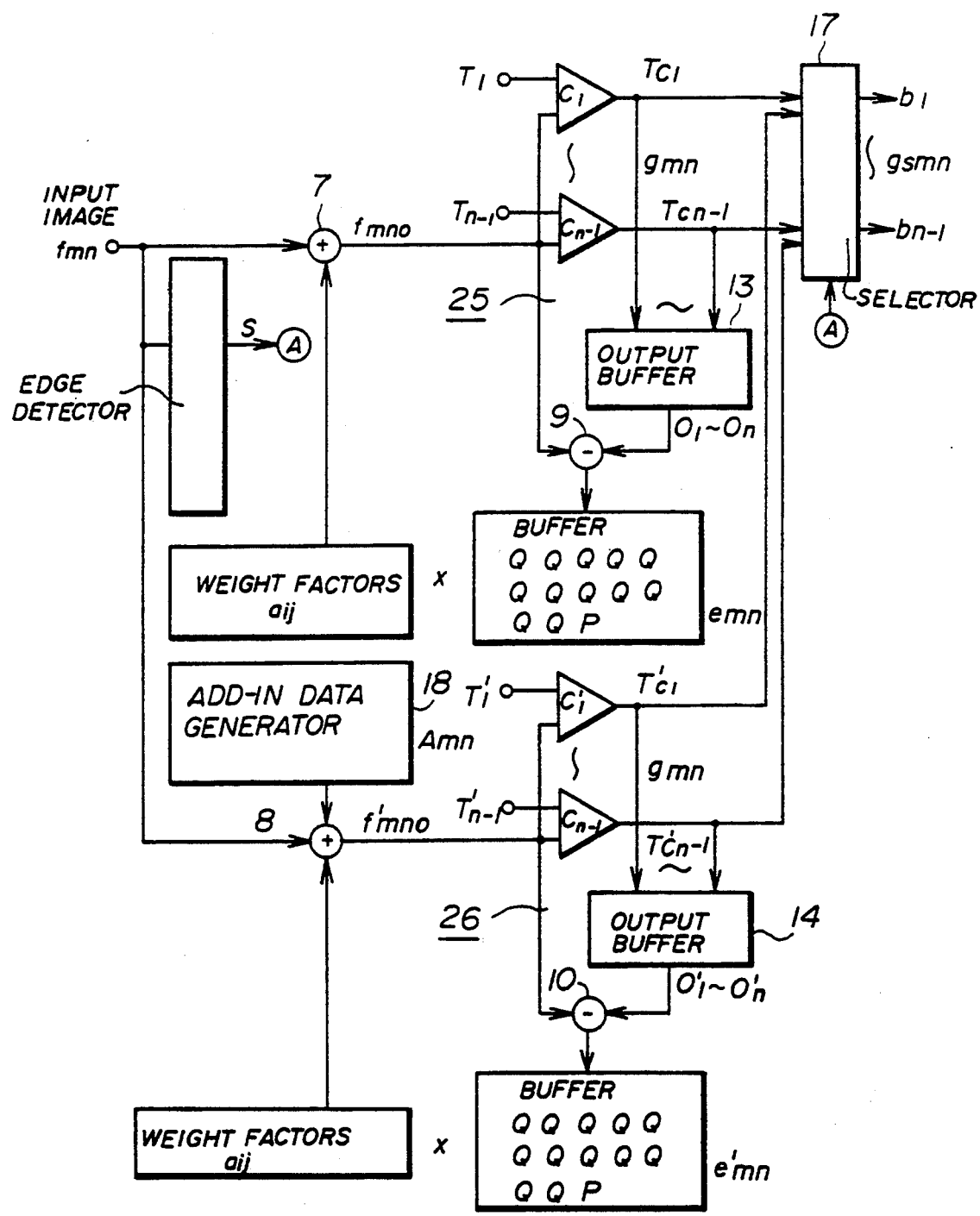
FIG. 8 is a diagram showing a second embodiment of the multilevel rendition part having a quantizer which includes an add-in data generator.

FIG. 8 shows the construction of a second embodiment of the multilevel rendition part in the image processing apparatus according to the present invention. In FIG. 8, the components of the multilevel rendition part 4 which are essentially the same as the corresponding components shown in FIG. 1 are designated by the same reference numerals, and a description thereof will be omitted. The multilevel rendition part 4 shown in FIG. 8 generally has the edge detector 6, a first quantizer 26, a second quantizer 25, an add-in data generator 18, and the selector 17.

In the multilevel rendition part 4 shown in FIG. 8, the add-in data generator 18 connected to the adder 8 is provided to add a pattern of supplementary data Amn to the input image data fmn. Both the first quantizer 25 and the second quantizer 26 include the set of weight factors aij having the same error spreading effect. In the add-in data generator 18, either a fixed pattern of supplementary data or a random pattern of supplementary data is stored.

Figure 9A:
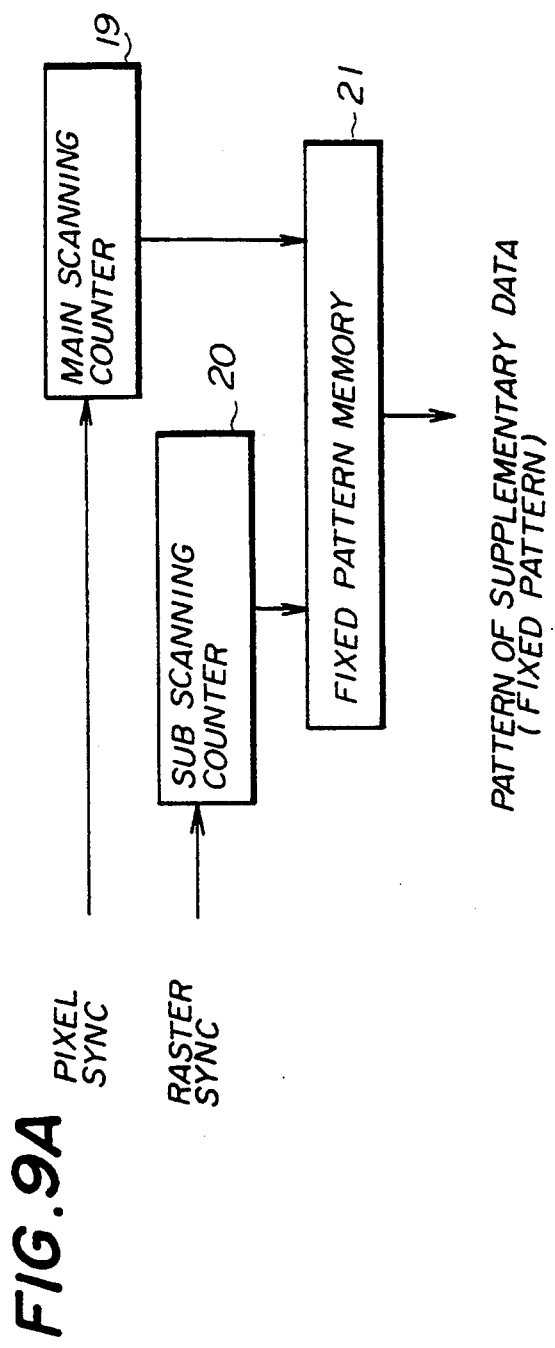
FIGS. 9A and 9B are block diagrams showing examples of the add-in data generator, which are applicable to the multilevel rendition part shown in FIG. 8.
Figure 9B:
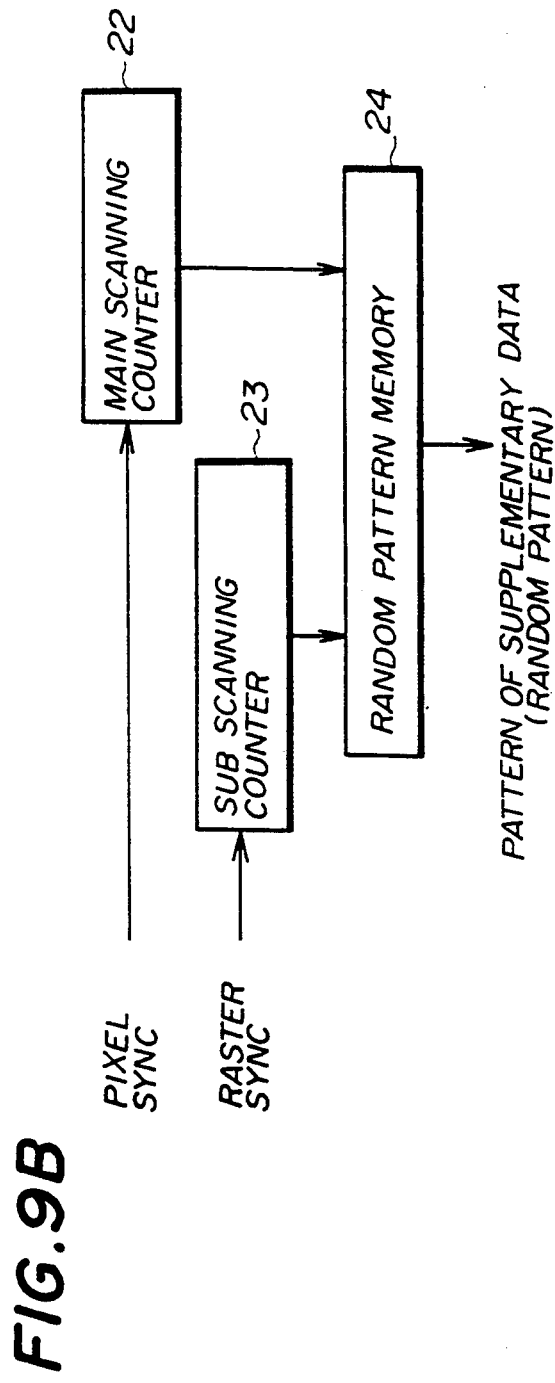

FIGS. 9A and 9B show the construction of two examples of the add-in data generator 18 in the multilevel rendition part 4 shown in FIG. 8. The add-in data generator 18 shown in FIG. 9A generates a fixed pattern of supplementary data to be added to the input image data. This add-in data generator 18 includes a main scanning counter 19, a sub scanning counter 20, and a fixed pattern memory 21. The add-in data generator 19 shown in FIG. 9B generates a random pattern of supplementary data to be added to the input image data. This add-in data generator 19 includes a main scanning counter 22, a sub scanning counter 23, and a random pattern memory 24.

In the multilevel rendition part 4 shown in FIG. 8, the second quantizer 26 generates quantized image data gmn' from error data emn'. The error data emn' are produced by the subtracter 10, which error data indicate differences between the correction values O1' through On' output from the output buffer 14 and the image data fmno' output by the adder 8 to which the supplementary data Amn of the add-in data generator 18 is added. This second quantizer 26 of FIG. 8 corresponds to the second quantizer 16 shown in FIG. 1. The first quantizer 25 generates quantized image data gmn from error data emn. The error data emn are produced by the subtracter 9, which error data indicate differences between the correction values O1 through On output by the output buffer 13 and the image data fmno output by the adder 7 to which no supplementary data Amn is added. This first quantizer 25 of FIG. 8 corresponds to the first quantizer 15 shown in FIG. 1. In accordance with the detect signal S received from the edge detector 6, the selector 17 selects either the quantized image data gmn output by the first quantizer 25 or the quantized image data gmn' output by the second quantizer 26, so that the output image data gsmn is output from the selector 17 to the printer 5.

Next, the operations performed by the add-in data generator 18 will be described with reference to FIG. 9A. The operations performed by the add-in data generator shown in FIG. 9B are essentially the same as those of the add-in data generator shown in FIG. 9A, a description thereof being omitted. In FIG. 9A, a pixel sync signal is input to the main scanning counter 19, and a count value of the main scanning counter 19 is incremented by the input pixel sync signal each time the target pixel in the input image is changed to a next one. A raster period sync signal is input to the sub scanning counter 20, and a count value of the sub scanning counter 20 is incremented by the input raster period sync signal each time a scanning line on which the target pixel is located is changed to a next one. The count value of the main scanning counter 19 and the count value of the sub scanning counter 20 are used to designate an address value of the fixed pattern memory 21 (or the random pattern memory 24). Thus, the pattern of supplementary data is output from the fixed pattern memory 21 (or the random pattern memory 24) to the adder 8 in accordance with the location of the target pixel being currently processed in the input signal.

FIG. 10 shows a fixed pattern of supplementary data output by the add-in data generator 18. The fixed pattern of supplementary data shown in FIG. 10 is added to the input image data at the adder 8. The fixed pattern of supplementary data shown in FIG. 10 includes a set of outermost pixels with negative values of supplementary data, and a set of inner pixels with positive values of supplementary data. A dot with a high density is likely to be printed for the locations of pixels of the output image corresponding to the inner pixels of the fixed pattern shown in FIG. 10, and a dot with a low density is likely to be printed for the locations of pixels of the output image corresponding to the outermost pixels of the fixed pattern shown in FIG. 10. Thus, when the target pixel is at a highlight portion of a continuous halftone image, it is possible to efficiently reduce undesired textures at a highlight portion of a continuous halftone image if the supplementary data output by the add-in data generator 18 is used. Conversely, when it is detected that the target pixel is at an edge portion of a discontinuous density image such as a character, the weight factors aij shown in FIG. 5A or FIG. 7A are used by the first quantizer 25 with no supplementary data being used. Thus, it is possible to efficiently reduce irregular edges which may appear at an edge portion of a discontinuous density image.

In a case in which the random pattern of supplementary data output by the add-in data generator 18 shown in FIG. 9B is used, the supplementary data including pixels having positive or negative density values at random are output by the random pattern memory 24. Thus, it is possible to reduce from the output image undesired textures which may appear at a highlight portion of a continuous halftone image.

In the above mentioned embodiment shown in FIG. 8, the edge detector 6 detects whether the target pixel being currently processed is at an edge portion of a discontinuous density image such as a character or at a highlight portion of a continuous halftone image such as a photograph, as described above. When the edge detector 6 detects the target pixel as lying at an edge portion of a discontinuous density image, the selector 17 selects the quantized image data gmn output by the first quantizer 25 using the weight factors aij with no supplementary data being used. Conversely, when the edge detector 6 detects the target pixel as lying at a highlight portion of a continuous halftone image, the selector 17 selects the quantized image data gmn' output by the second quantizer 26 using the supplementary data added by the add-in data generator 18. The selected output data is output from the selector 17 to the printer 5 so that an image indicated by the quantized image signal gsmn is output.

Accordingly, in the case of the multilevel rendition part of the image processing apparatus shown in FIG. 8, it is possible to efficiently reduce undesired textures at a highlight portion of a continuous halftone image as well as irregular edges at an edge portion of a discontinuous density image. Thus, when an image is quantized through the error spreading process, it is possible to make both the resolution of the output image and the gradation characteristics thereof satisfactory for any kind of input images.

Further, the present invention is not limited to the above described embodiments, and variations and modifications may be made without departing from the scope of the present invention.

What is claimed is:

1. An image processing apparatus in which an input image signal is quantized into an output multilevel image signal through an error spreading process, said output multilevel image signal indicating one of "n" different density levels ($n \geq 2$), said image processing apparatus comprising:

detection means for detecting whether or not a target pixel of the input image signal is at an edge portion of a bi-level image;

a first quantizer for generating quantized image data with respect to the target pixel by using a first error spreading filter containing a set of weight factors aij ($1 \leq i \leq m$; $1 \leq j \leq n$), the filter having a relatively high error spreading effect, such that a density error between the input image signal and the output multilevel image signal, which error is multiplied by one of the weight factors aij, is incorporated in "m" neighboring pixels surrounding the target pixel;

a second quantizer for generating quantized image data with respect to the target pixel by using a second error spreading filter containing a set of weight factors bij ($1 \leq i \leq m$; $1 \leq j \leq n$), the filter having a relatively low error spreading effect, such that a density error between the input image signal and the output multilevel image signal, which error is multiplied by one of the weight factors bij, is incorporated in "m" neighboring pixels surrounding the target pixel; and selection means for selecting either the quantized image data generated by the first quantizer or the quantized image data generated by the second quantizer in accordance with the result of a detection made by the detection means, wherein the quantized image data generated by the second quantizer is selected to output said quantized image data when said detection means detects the target pixel as lying at an edge portion of a bi-level image, and, when said detection means detects that the target pixel does not lie at an edge portion of a bi-level image, the quantized image data generated by the first quantizer is selected to output said quantized image data.

2. An image processing apparatus according to claim 1, wherein said detection means detects the target pixel as lying at a highlight portion of a continuous halftone image when it is detected that the target pixel does not lie at an edge portion of a bi-level image.

3. An image processing apparatus according to claim 1, wherein said first error spreading filter of said first quantizer has a relatively large filter size, and said second error spreading filter has a relatively small filter size, said first error spreading filter being used by said first quantizer to generate the quantized image data when it is detected that the target pixel is at an edge portion of a bi-level image, and said second error spreading filter being used by said second quantizer to generate the quantized image data when it is detected that the target pixel is not at an edge portion of a bi-level image.

4. An image processing apparatus according to claim 1, wherein said first error spreading filter of said first quantizer contains the weight factors ai in which the value of a weight factor corresponding to a neighboring pixel is greater, the nearer that said neighboring pixel is located to the target pixel, and said second error spreading filter of said second quantizer contains the weight factors bi which all have the same value.

5. An image processing apparatus according to claim 1, wherein said second quantizer generates the quantized image data with respect to the target pixel by using an error spreading filter containing a weight factor bij ($1 \leq i \leq m$; $1 \leq j \leq n$), the filter having a relatively low error spreading effect, such that a density error between the input image signal and the output multilevel image signal, which error is multiplied by one of the weight factors bij, is incorporated in one neighboring pixel from among pixels surrounding the target pixel.

6. An image processing apparatus according to claim 1, further comprising a supplementary data generator, coupled to said second quantizer, for adding a pattern of supplementary data to the density error between the input image signal and the output multilevel image signal, which error is multiplied by one of the weight factors in said second quantizer, wherein said second error spreading filter contains weight factors which are the same as the weight factors ai of said first quantizer, said density error being incorporated in the "m" neighboring pixels surrounding the target pixel.

7. An image processing apparatus according to claim 6, wherein the pattern of supplementary data generated by said supplementary data generator is stored in a fixed pattern memory.

8. An image processing apparatus according to claim 6, wherein the pattern of supplementary data generated by said supplementary data generator is stored in a random pattern memory.

* * * * *